US011788558B2

(12) United States Patent
Rognin et al.

(10) Patent No.: US 11,788,558 B2
(45) Date of Patent: Oct. 17, 2023

(54) FAN CASING FOR AN AIRCRAFT TURBOMACHINE DIRECTLY INCORPORATING ABRADABLE PORTIONS AND HAVING ACOUSTIC PROPERTIES

(71) Applicant: SAFRAN AIRCRAFT ENGINES, Paris (FR)

(72) Inventors: Florent Louis Andre Rognin, Moissy-Cramayel (FR); Clement Bourolleau, Moissy-Cramayel (FR); Serge Domingues, Moissy-Cramayel (FR); Vincent Pascal Fiore, Moissy-Cramayel (FR); Anwer Siraj, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/272,735

(22) PCT Filed: Aug. 28, 2019

(86) PCT No.: PCT/FR2019/051988
§ 371 (c)(1),
(2) Date: Mar. 2, 2021

(87) PCT Pub. No.: WO2020/049243
PCT Pub. Date: Mar. 12, 2020

(65) Prior Publication Data
US 2021/0355962 A1    Nov. 18, 2021

(30) Foreign Application Priority Data
Sep. 4, 2018   (FR) ...................................... 1857910

(51) Int. Cl.
*F04D 29/66*    (2006.01)
*F04D 29/52*    (2006.01)

(52) U.S. Cl.
CPC ......... *F04D 29/665* (2013.01); *F04D 29/522* (2013.01); *F04D 29/526* (2013.01); *F05D 2220/323* (2013.01); *F05D 2230/30* (2013.01)

(58) Field of Classification Search
CPC ...... F04D 29/522; F04D 29/66; F04D 29/663; F04D 29/665
See application file for complete search history.

(56) References Cited

U.S. PATENT DOCUMENTS

2014/0212273 A1* 7/2014 Le Borgne .............. F01D 25/24
415/200

FOREIGN PATENT DOCUMENTS

CN    204250355 U  *  4/2015
EP       1918200 A1     5/2008
(Continued)

OTHER PUBLICATIONS

International Search Report and Written Opinion received for PCT Patent Application No. PCT/FR2019/051988, dated Nov. 21, 2019, 22 pages (10 pages of English Translation and 12 pages of Original Document).

*Primary Examiner* — Courtney D Heinle
*Assistant Examiner* — John S Hunter, Jr.
(74) *Attorney, Agent, or Firm* — WOMBLE BOND DICKINSON (US) LLP

(57) ABSTRACT

A fan casing for an aircraft turbomachine, the casing including a one-piece annular body, the one piece annular body including a radially internal annular surface, a first annular portion of which is made of an abradable material, wherein a second annular portion of the internal surface comprises blind holes conferring acoustic properties to the second portion.

17 Claims, 3 Drawing Sheets

(56) References Cited

FOREIGN PATENT DOCUMENTS

| FR | 2975735 | A1 | 11/2012 |
| FR | 3048024 | A1 | 8/2017 |
| FR | 3059044 | A1 | 5/2018 |

* cited by examiner

FAN CASING FOR AN AIRCRAFT TURBOMACHINE DIRECTLY INCORPORATING ABRADABLE PORTIONS AND HAVING ACOUSTIC PROPERTIES

TECHNICAL FIELD

The present invention relates to a fan casing of an aircraft turbomachine. The invention also concerns an aircraft turbomachine, such as a turbojet engine, comprising such a casing. The invention also relates to a method for manufacturing such a casing.

BACKGROUND

The state of the art comprises in particular patent applications FR-A1-2 975 735, FR-A1-3 048 024, FR-A1-3 059 044 and EP-A1-1 918 200.

An aircraft turbomachine, such as a turbojet engine, generally comprises a fan surrounded by a fan casing. This fan casing defines in particular a duct allowing air to enter the turbomachine, and its primary function is to ensure retention in the event of debris ingestion or loss of a fan vane.

In order to protect the rotating vanes of the fan, there is a fan casing, a portion of which is lined with an element made of abradable material. FIG. 1 shows a one-piece fan casing 1 with an abradable material element 2 facing a rotating vane 3 of the fan.

However, such a casing does not include acoustic elements to reduce the noise emissions generated by the turbomachine.

In order to reduce these noise emissions, as shown in FIGS. 2 and 3, a fan casing 10 may have a wall 12 the internal face of which is covered with an acoustic lining 20. The acoustic lining 20 may comprise a substantially annular acoustic shell 22 as shown in FIG. 4a, or a plurality of acoustic panels 24, e.g. six panels in the shape of an annular portion as shown in FIG. 4b, distributed around the inner circumference of the wall 12. As shown in FIGS. 2 and 3, the casing 10 also comprises an abradable lining 30 arranged opposite the tips of the fan vanes 36. The abradable lining 30 comprises a plurality of abradable cartridges 32, e.g., five cartridges in the shape of an annular portion as shown in FIG. 4c, distributed around the inner circumference of the wall 12 and lined with abradable material.

However, these abradable and acoustic linings are expensive, since they are designed, developed and manufactured specifically for a fan casing, which increases the cost of manufacturing of the casing itself.

In addition, when designing the various acoustic elements, it can be seen that the design of the interfaces and the clearances between these elements limit the possibilities and the acoustic performances. For example, there are geometric and cosmetic non-conformities in the acoustic panels, which are related to the different materials of which they are made.

In addition, difficulties are encountered when assembling the acoustic lining to the casing, particularly in relation to interference between the various elements of which it is composed. For example, a static over-stressing may occur at the bolted connections used to attach the acoustic lining to the casing, or abnormal compression of the joints arranged between the various elements composing it may occur.

The present invention aims in particular to provide a simple, economical and effective solution to these problems, making it possible to avoid the disadvantages of the known technique.

In particular, the present invention makes it possible to provide a one-piece fan casing with an element made of abradable material and with an element having acoustic properties.

DESCRIPTION OF THE INVENTION

For this purpose, the invention concerns a fan casing for an aircraft turbomachine, such as a turbojet engine, said casing comprising a one-piece annular body, said body comprising a radially internal annular surface, a first annular portion of which is made of an abradable material, characterised in that a second annular portion of said internal surface comprises blind holes conferring acoustic properties to said second portion.

According to the invention, an abradable material is a material which, when brought into contact with a rotating vane of the fan, wears out preferentially to this vane.

For the purposes of the invention, a portion having acoustic properties is a portion configured to absorb, at least in part, the noise emitted by the fan in operation, thereby limiting the noise pollution for the aircraft passengers.

According to the invention, a blind hole corresponds to a non-through perforation in the body of the fan casing.

Advantageously, the integration of an acoustic function directly on the fan casing simplifies the casing, as well as its assembly, and thus reduces its assembly time.

This also minimizes the impact of the acoustic function on the mechanical characteristics of the portion with acoustic properties, while maintaining the capacity of the casing to ensure mechanical continuity between the air intake duct and the intermediate casing of the turbomachine. The interfaces and clearances between the various elements of the acoustic lining are eliminated, allowing for better aerodynamic continuity, with a gain in performance.

In addition, this reduces the probability of failure of said casing by reducing the loss or ingestion of possible parts.

This also reduces the diameter of the casing, as well as its mass by approximately 30%. Therefore, for an equivalent casing mass, the thickness of the casing can be increased, which allows better resistance to the retention of debris or of a fan vane. In addition, this allows the distance between sound sources and acoustic treatments to be optimised.

In addition, this ensures the geometry of the aerodynamic vein of the secondary flow.

Advantageously, the blind holes in the casing allow the absorption of sound waves. It is possible to vary the depth, the location and the diameter of the holes according to the acoustic attenuation requirements.

Said body is preferably made of three-dimensional woven composite material. For example, the body can be made of carbon fibre textile.

In the sense of the invention, a three-dimensional woven composite material is a material obtained by three-dimensional weaving.

This advantageously allows the mass of the casing to be reduced, especially in comparison with a casing made of a metal material such as steel or titanium.

Alternatively, the body can be made of metallic material by additive manufacturing.

The first annular portion can be lined with an annular element made of abradable material, especially when the body is made of three-dimensional woven composite material.

Alternatively, the first annular portion can be made directly from abradable material, especially when the body is made by additive manufacture.

Preferably, a third annular portion of said internal surface comprises blind holes conferring acoustic properties to said third portion. Said second and third portions may be located respectively upstream and downstream of said first portion, the direction of gas flow in the turbomachine being defined from upstream to downstream.

The most important characteristic of the acoustic attenuation is the percentage open area (POA), which is determined by the diameter and the location of the blind holes in the portions with acoustic properties.

The blind holes of said second and third portions may have different dimensions and/or cross-sections and/or arrangements. This allows advantageously to have a different percentage open area between the different portions having acoustic properties of the casing.

The blind holes of said second portion may have a smaller diameter than that of said third portion.

The blind holes of said second portion may be spaced by a distance along the longitudinal axis of the casing, called first axis, which is smaller than the distance between the blind holes of said third portion along said first axis. The blind holes of said first portion may be spaced by a distance along an axis orthogonal to the first axis, called second axis, greater than the distance between the blind holes of said third portion along said second axis.

Advantageously, the percentage open area of the second portion is less than the percentage open area of the third portion.

The invention also concerns an aircraft turbomachine, such as a turbojet engine, comprising:
  a fan comprising rotating vanes, and
  a fan casing according to the invention, the fan being arranged in said casing, said first portion and said element extending around said vanes.

The invention also relates to a method of manufacturing a fan casing according to the invention, the method comprising:
  weaving a fiber texture to form said body of three-dimensional woven composite material,
  winding said fiber texture, over at least one turn, onto a mold having substantially the shape of said casing, so as to form a preform having substantially the shape of said casing,
  closing said mold by counter-shapes,
  injecting a resin into said mold, and
  polymerisation in said mold of said resin in order to obtain said casing made of a three-dimensional woven composite.

According to an embodiment, the manufacturing method comprises:
  prior to injecting said resin into said mold, inserting needles into at least one portion of said preform corresponding to said second portion and/or said third portion, and
  during the polymerisation of said resin, removing said needles from said preform so as to obtain blind holes in said second portion and/or in said third portion.

According to another embodiment, the manufacturing method comprises:
  after the polymerisation of said resin, drilling blind holes in said second portion and/or in said third portion of said casing.

DESCRIPTION OF FIGURES

The invention will be better understood and other details, characteristics and advantages of the invention will appear more clearly when reading the following description made as a non limiting example and with reference to the annexed drawings in which.

DETAILED DESCRIPTION

The invention relates to an aircraft turbomachine, for example a turbojet engine.

Figure 1:
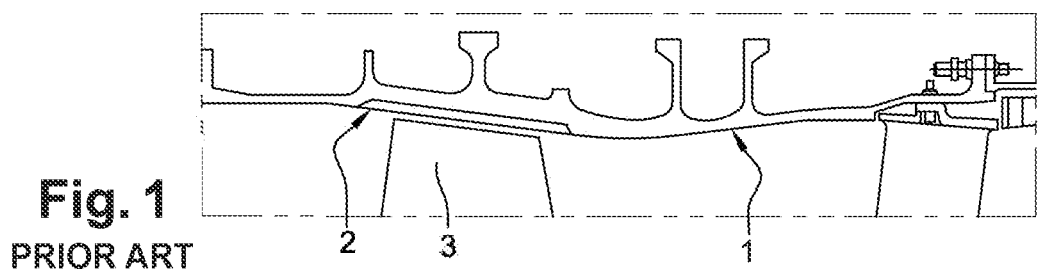
FIG. 1 is a semi-axial sectional view of a fan casing according to the prior art.
Figure 2:
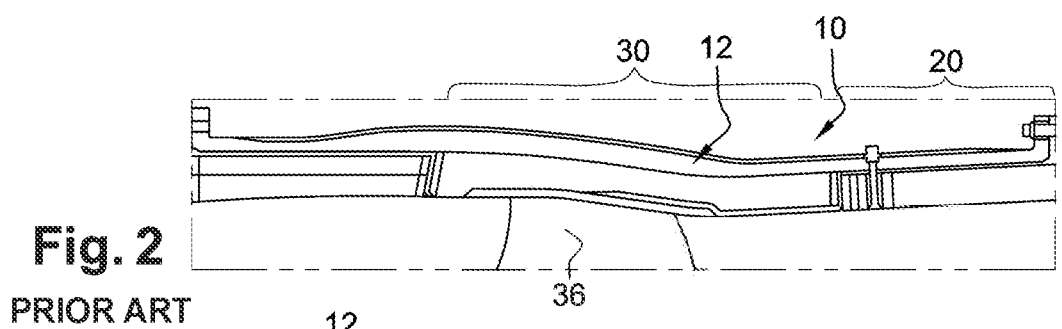
FIGS. 2 and 3 are semi-axial and perspective views respectively of a part of a fan casing according to the prior art.
Figure 3:
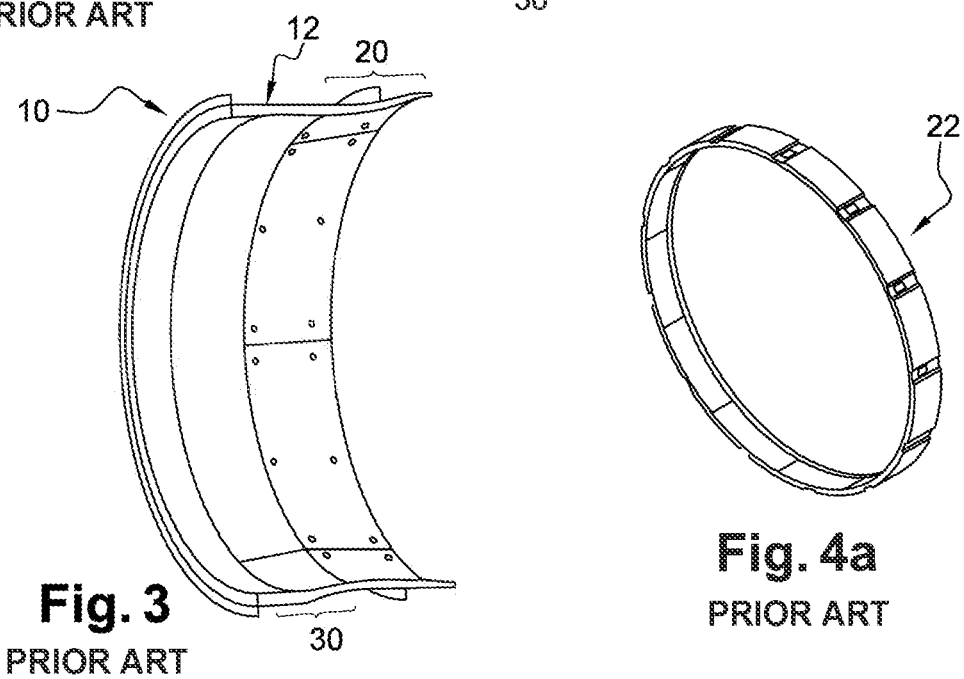
Figure 4A:
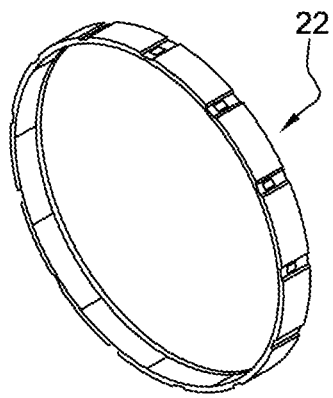
FIGS. 4a, 4b and 4c are perspective views of respectively the acoustic shell, an acoustic panel and an abradable panel of the fan casing of FIGS. 2 and 3.
Figure 4B:
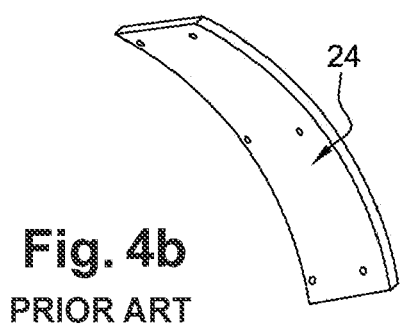
Figure 4C:
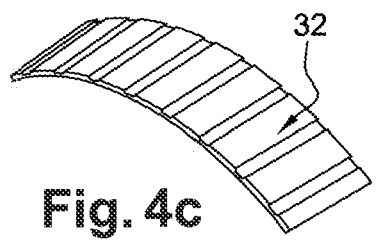
Figure 5:
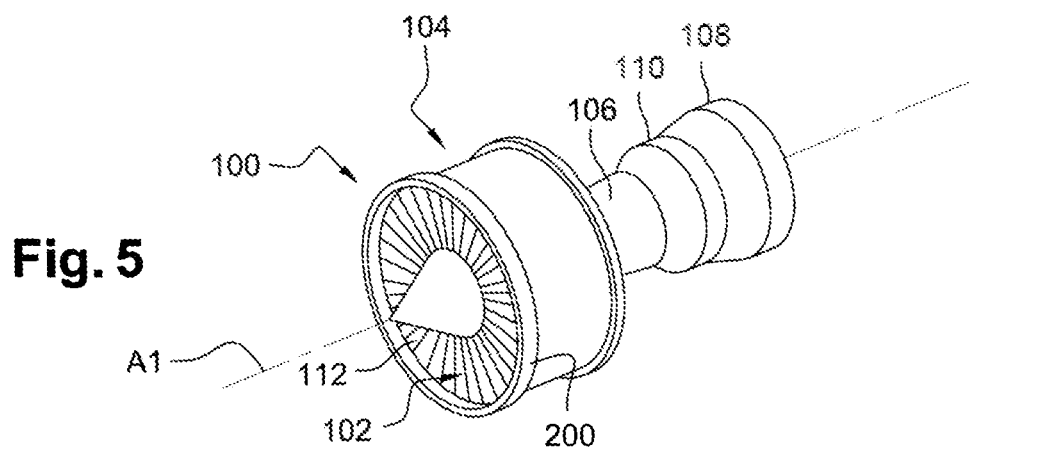
FIG. 5 is a very schematic perspective view of a turbomachine according to the invention.

As shown in FIG. 5, such a turbomachine 100 comprises, from upstream to downstream in the direction of gas flow, a fan 102 arranged at the inlet of the turbomachine, at least one compressor 104, here a low-pressure compressor and a high-pressure compressor, a combustion chamber 106, a low-pressure turbine 108 and a high-pressure turbine 110. The turbines 108 and 110 are coupled to the compressor 104 and the fan 102 respectively by respective coaxial shafts. The fan 102 comprises rotating vanes 112 and is surrounded by a fan casing 200.

Figure 6A:
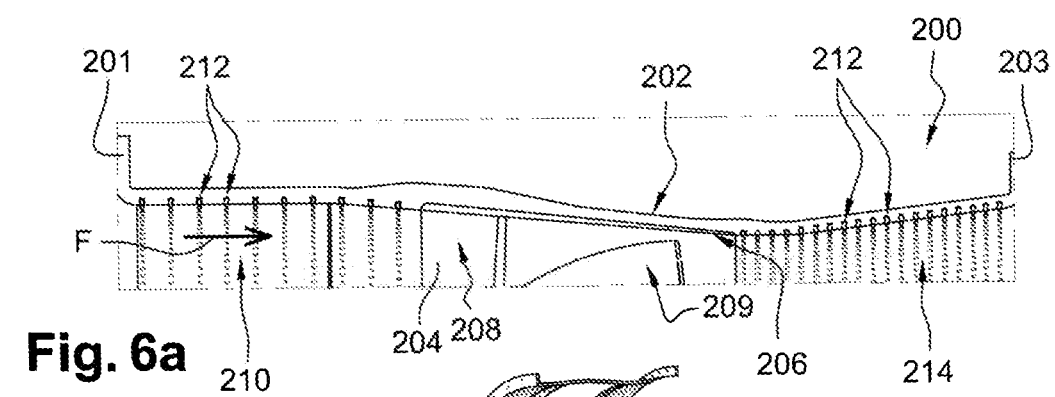
FIGS. 6a and 6b are semi-axial and perspective views respectively of a part of a fan casing according to the invention.
Figure 6B:
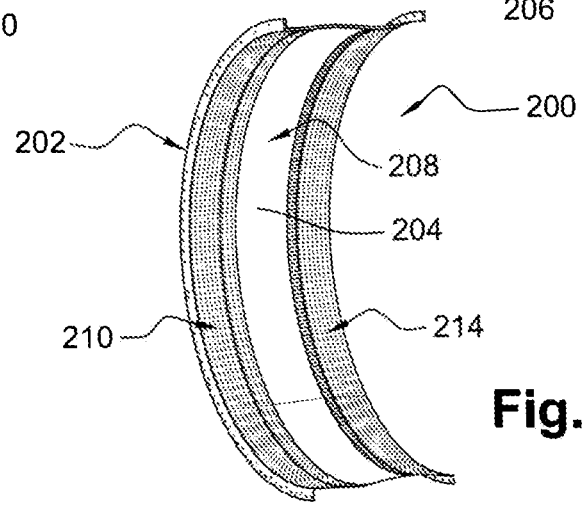
Figure 7:
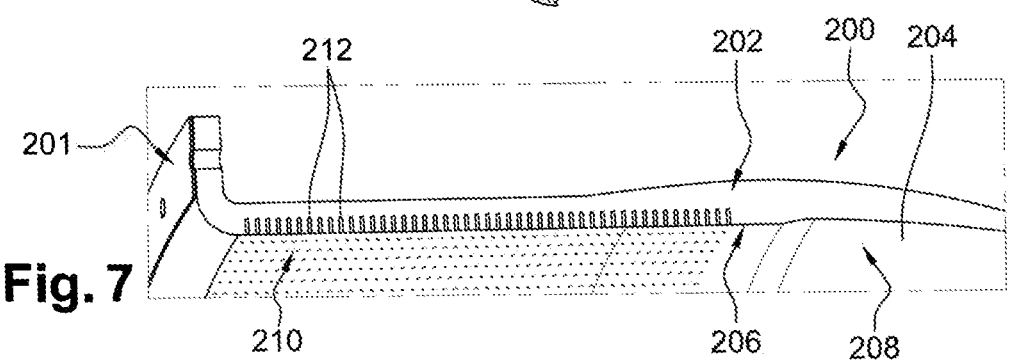
FIG. 7 is a sectional view of a part of a fan casing from FIG. 6b, FIGS. 8a and 8b are very schematic views of blind holes respectively in the second and the third portions of a fan casing according to the invention.

A fan casing 200 according to the invention is shown in FIGS. 6a, 6b and 7. The casing 200 comprises a one-piece annular body 202 extending longitudinally along the longitudinal axis of the turbomachine shown as A1 in FIG. 5. The body 202 can be made of a three-dimensional woven composite material. The body 202 can be made of metallic material by additive manufacture. The casing may have a flange 201 at its upstream axial end and a flange 203 at its downstream axial end. The flanges 201, 203 allow the casing 200 to be mounted.

The body 202 comprises a radially internal annular surface 206 with respect to the elongation axis of the casing 200.

For the purposes of the invention, "radially internal annular surface" means the surface of the casing, which is annular, located inside the casing in relation to the axis of elongation of the casing 200, and therefore in relation to the axis of the turbomachine 100. In contrast, "radially external annular surface" means the annular surface of the casing which is located outside the casing with respect to the elongation axis of the casing 200, and thus with respect to the axis of the turbomachine 100. The radially internal annular surface is radially closer to the elongation axis of the casing than the radially external annular surface.

The radially internal annular surface 206 has a first portion 208 of abradable material. The first portion 208 is configured to extend around the vanes 209 of the fan.

The casing 200 may have an annular element 204 of abradable material, for example, when the body 202 is made of three-dimensional woven composite material. The first annular portion 208 can be lined with the element 204. In particular, the first portion 208 and the element 204 can be configured to extend around the vanes 209 of the van.

The first annular portion 208 can be made directly from abradable material, for example, when the body 202 is made from metallic material by additive manufacture.

The first portion 208 is located away from the flanges 201, 203.

The internal surface 206 also comprises a second annular portion 210 with blind holes 212 conferring acoustic properties to the second portion 210. The second portion 210 is located between the upstream flange 201 and the first portion 208.

The first portion 208 made of abradable material and the second portion 210 with acoustic properties can be an integral part of the casing 200. Specifically, these first and second portions 208, 210 may not be added to the casing, but the casing and the first and second portions 208, 210 may be in one piece, especially if the body is made of metallic material by additive manufacturing.

The internal surface 206 may also comprise a third annular portion 214 with blind holes 212 conferring acoustic properties to this third portion 214. The third portion 214 is located between the first portion 208 and the downstream flange 203.

In particular, the first portion 208, the second portion 210 and the third portion 214 may be an integral part of the casing 200. These first, second and third portions 208, 210, 214 may not be added to the casing, but the casing and the first, second and third portions 208, 210, 214 may be in one piece, especially in the case where the body is made by additive manufacture of metallic material.

As shown in FIGS. 6a and 6b, the second and third portions 210, 214 are located respectively upstream and downstream of the first portion 208, the direction of gas flow in the turbomachine being defined from upstream to downstream and represented by the arrow F in FIG. 6a. In other words, the first portion 208 is arranged between the second portion 210 and the third portion 214.

Figure 8A:
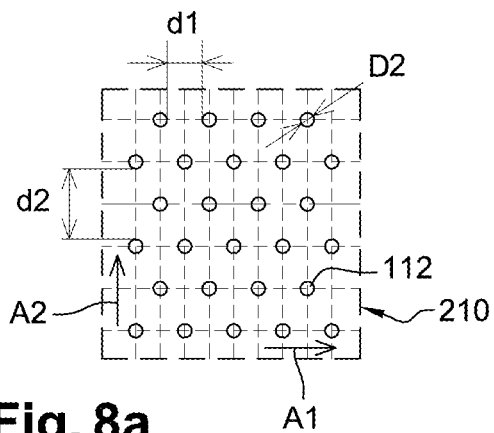
Figure 8B:
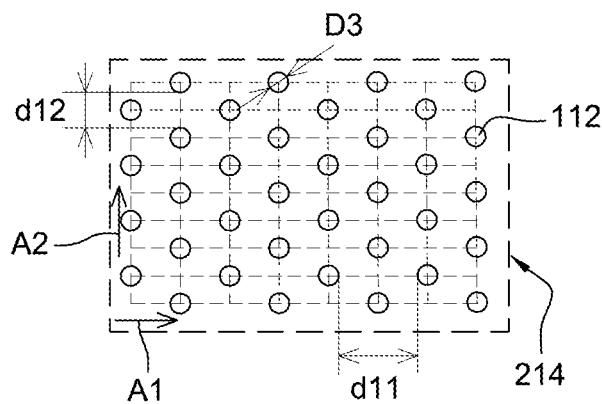

In FIGS. 8a and 8b, the blind holes 212 of the second and third portions 210, 214 are shown with a cross section that is circular radially with respect to the longitudinal axis A1. Of course, the blind holes in the second and third portions can have any cross-sectional shape, including circular, oval, or polygonal.

The blind holes 212 in the second portion 210 may have different cross-sections than the blind holes 212 in the third portion 214.

The blind holes 212 in the second portion 210 may have different cross-sections than other blind holes 212 in the second portion 210. Similarly, the cross-sections of the blind holes 212 in the third portion 214 may be different from those of other blind holes 212 in the third portion 214.

The blind holes 212 in the second portion 210 may have different dimensions than the blind holes 212 in the third portion 214.

The dimensions, such as diameter or depth, of some blind holes 212 in the second portion 210 may be different from those of other blind holes 212 in the second portion 210. Similarly, some blind holes 212 in the third portion 214 may have different dimensions than other blind holes 212 in the third portion 214.

The blind holes 212 in the second portion 210 may have a smaller diameter than the diameter of the third portion 214. For example, in FIG. 8a, the diameter D2 of the blind holes 212 in the second portion 210 may be between 7% and 13% of the thickness of the casing 200. In FIG. 8b, the diameter D3 of the blind holes 212 in the third portion 214 may be between 10% and 16% of the thickness of the casing 200.

The blind holes 212 in the second portion 210 may be shallower in depth than the blind holes 212 in the third portion 214. For example, the casing 200 having a thickness between 10 mm and 14 mm, the depth of the blind holes 212 in the second portion 210 may be between 7% and 50% of the thickness of the casing 200, and the depth of the blind holes 212 in the third portion 214 may be between 14% and 60% of the thickness of the casing 200.

The blind holes 212 in the second portion 210 may have different arrangements than the blind holes 212 in the third portion 214.

For example, the blind holes 212 in the second and third portions 210, 214 may be aligned as shown in FIGS. 6a and 7. The blind holes 212 in the second and third portions 210, 214 can be arranged in a staggered pattern, as shown in FIGS. 8a and 8b.

The blind holes 212 in the second portion 210 may be spaced by a distance along the longitudinal axis of the casing, noted A1, less than the distance between the blind holes 212 in the third portion 214 along the axis A1. For example, in FIG. 8a, the blind holes 212 in the second portion 210 may be spaced by a distance d1 between 1.5 times the diameter D2 and 2.5 times the diameter D2 along the axis A1. In FIG. 8b, the blind holes 212 in the third portion 214 can be spaced by a distance d11 between 2.0 times the diameter D3 and 3.5 times the diameter D3 along the axis A1.

The blind holes 212 in the second portion 210 may be spaced by a distance orthogonal to the first axis, noted A2, greater than the distance between the blind holes 212 in the third portion 214 along the axis A2. For example, in FIG. 8a, the blind holes 212 in the second portion 210 may be spaced by a distance d2 between 3.0 times the diameter D2 and 4.0 times the diameter D2 along the axis A2. In FIG. 8b, the blind holes 212 in the third portion 214 can be spaced by a distance d12 between 1.0 time the diameter D3 and 2.0 times the diameter D3 along the axis A2.

With such configuration the percentage open area of the second portion 210 is less than the percentage open area of the third portion 214. For example, the percentage open area of the second portion 210 may be substantially equal to 6%, while the percentage open area of the third portion 214 may be substantially equal to 9%.

Figure 9A:
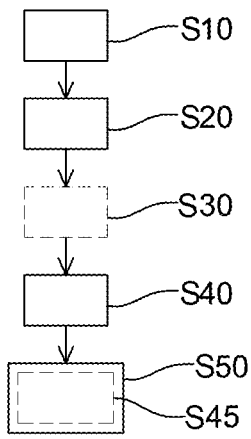
FIGS. 9a and 9b are flow diagrams of a method for manufacturing a fan casing according to the embodiments of the invention.
Figure 9B:
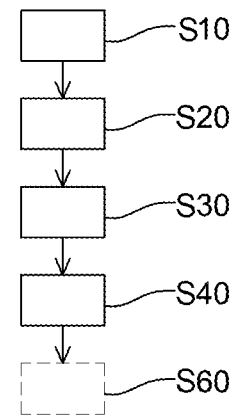

The invention also relates to a method for manufacturing a fan casing 200 according to the invention, the steps of which are shown in FIGS. 9a and 9b.

The method comprises a step S10 of weaving a fiber texture to form the body 202 of three-dimensional woven composite material. For example, the fiber texture is made of carbon fibre textile.

When weaving the fiber texture, the thickness of the fiber texture is adjusted to the different portions of the body 202. In particular, the thickness of the fiber texture depends on the weaving patterns used to weave said fiber texture. For example, at the upstream and downstream flanges, the thickness of the preform is shaped to have good thermomechanical strength in statics, while the thickness of the preform at the second and third portions of the body is shaped to have good mechanical strength in dynamics. The thickness of the preform at the second and third portions of the body is reduced compared to the thickness of the first portion of the body. The thickness of the preform at the first portion of the body is shaped to have a good mechanical strength in both static and dynamic conditions.

The method then comprises a step S20 of winding the fiber texture, over at least one revolution, onto a mold having substantially the shape of the casing, so as to form a preform 300 having substantially the shape of the casing.

Figure 10:
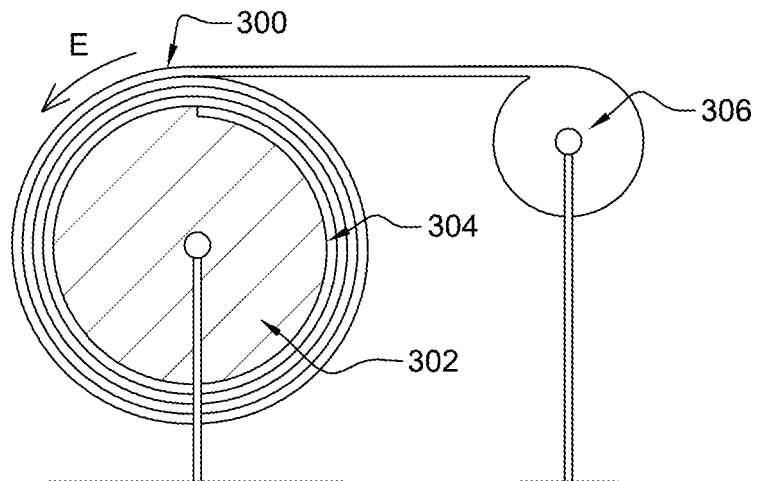
FIG. 10 is a schematic view of a machine implementing the method for manufacturing a fan casing according to the invention.

For example, as shown in FIG. 10, the fiber texture is wound over four turns on a mold 302 of substantially cylindrical shape. In particular, the mold 302 has a profile corresponding to that of the casing to be manufactured. Specifically, the mold 302 has an external surface 304 whose profile corresponds to the internal surface 206 of the body 202 of the casing 200 to be manufactured. The three-dimensional woven composite material is wound onto the mold 302 to match the profile of the mold. The preform 300 thus has a substantially annular shape. The three-dimensional woven composite material is unwound from a storage mandrel 306. The winding direction of the preform 300 on the mold 302 is represented by the arrow E.

The method also comprises a step S30 of closing the mold with counter-shapes. In particular, the mold is closed water-tight.

The method then comprises a step S40 of injecting a resin into the mold. The resin, e.g. an epoxy resin, densifies the preform. A liquid resin is injected inside the mold to impregnate the entire three-dimensional woven composite material of the preform.

The method then comprises a step of polymerisation of the resin in the mold to obtain the casing. The polymerisation is carried out by heat treatment, e.g. by heating the mold.

According to an embodiment illustrated by the flow chart in FIG. 9a, the method may comprise, prior to step S40, a step of inserting needles or pins into the portion or portions of the preform to which acoustic properties are to be conferred. These needles are used to form the blind holes. In particular, the mold can be provided with retractable or removable needles which can protrude into the portions of the preform to which acoustic properties are to be conferred.

The method may then comprise, during the step S50, a step S45 of retracting the needles from the preform so as to obtain blind holes in the portion(s) of the preform to which acoustic properties are to be conferred.

Preferably, the needles are inserted and then removed from the second and third portions of the body of the casing.

According to another embodiment, as shown in the flow-chart in FIG. 9b, the method may comprise, after the step S40, a step S60 of drilling blind holes in the portion(s) of the preform to which acoustic properties are to be conferred. Preferably the blind holes are drilled in the second and third portions of the body of the casing.

The invention claimed is:

1. A fan casing for an aircraft turbomachine, said fan casing comprising a one-piece annular body, said one-piece annular body comprising a radially internal annular surface, a first annular portion of which is made of an abradable material, wherein a second annular portion of said internal surface comprises blind holes conferring acoustic properties to said second annular portion, the second annular portion and the body forming a monolithic piece.

2. The fan casing according to claim 1, wherein said one-piece annular body is made of a three-dimensional woven composite material.

3. The fan casing according to claim 1, wherein said first annular portion is lined with an annular element of abradable material.

4. The fan casing according to claim 3, wherein a third annular portion of said internal surface comprises blind holes conferring acoustic properties to said third annular portion.

5. The fan casing according to claim 4, wherein the blind holes of said second and third annular portions have different dimensions and/or cross-sections and/or arrangements.

6. The fan casing according to claim 5, wherein said second and third annular portions are located respectively upstream and downstream of said first annular portion, the blind holes of said second annular portion having a smaller diameter than that of said third annular portion.

7. The fan casing according to claim 2, in which the blind holes of said second annular portion are spaced apart by a distance along a longitudinal axis of the fan casing, which is smaller than a distance between blind holes of a third annular portion along said longitudinal axis, and the blind holes of said second annular portion are spaced by a distance along an axis orthogonal to the longitudinal axis, greater than a distance between the blind holes of said third annular portion along said orthoganal axis.

8. An aircraft turbomachine, comprising:
a fan comprising rotating vanes, and
a fan casing according to claim 1, the fan being arranged in said fan casing, said first annular portion and said element extending around said vanes.

9. A method of manufacturing a fan casing according claim 2 comprising:
weaving a fiber texture to form said one piece annular body of three-dimensional woven composite material,
winding said fiber texture, over at least one turn, onto a mold having substantially the shape of said fan casing, so as to form a preform having substantially the shape of said fan casing,
closing said mold by counter-shapes,
injecting a resin into said mold, and
polymerisation in said mold of said resin in order to obtain said fan casing made of a three-dimensional woven composite.

10. The method of manufacture according to claim 9, comprising:
prior to the injection of said resin into said mold, inserting needles into at least one portion of said preform corresponding to said second annular portion and/or said third annular portion, and
during polymerisation of said resin, removing said needles from said preform so as to obtain blind holes in said second annular portion and/or in said third annular portion.

11. The method of manufacture according to claim 9, comprising:
after polymerisation of said resin, drilling blind holes in said second annular portion and/or in said third annular portion of said fan casing.

12. A method of manufacturing a fan casing according claim 3 comprising:
weaving a fiber texture to form said one piece annular body of three-dimensional woven composite material, winding said fiber texture, over at least one turn, onto a mold having substantially the shape of said fan casing, so as to form a preform having substantially the shape of said fan casing,
closing said mold by counter-shapes,
injecting a resin into said mold, and
polymerisation in said mold of said resin in order to obtain said fan casing made of a three-dimensional woven composite.

13. A method of manufacturing a fan casing according claim 4 comprising:
weaving a fiber texture to form said one piece annular body of three-dimensional woven composite material,
winding said fiber texture, over at least one turn, onto a mold having substantially the shape of said fan casing, so as to form a preform having substantially the shape of said fan casing,
closing said mold by counter-shapes,
injecting a resin into said mold, and
polymerisation in said mold of said resin in order to obtain said fan casing made of a three-dimensional woven composite.

14. A method of manufacturing a fan casing according claim 5 comprising:
weaving a fiber texture to form said one piece annular body of three-dimensional woven composite material,
winding said fiber texture, over at least one turn, onto a mold having substantially the shape of said fan casing, so as to form a preform having substantially the shape of said fan casing,
closing said mold by counter-shapes,
injecting a resin into said mold, and
polymerisation in said mold of said resin in order to obtain said fan casing made of a three-dimensional woven composite.

15. A method of manufacturing a fan casing according claim 6 comprising:
weaving a fiber texture to form said one piece annular body of three-dimensional woven composite material,
winding said fiber texture, over at least one turn, onto a mold having substantially the shape of said fan casing, so as to form a preform having substantially the shape of said fan casing,
closing said mold by counter-shapes,
injecting a resin into said mold, and
polymerisation in said mold of said resin in order to obtain said fan casing made of a three-dimensional woven composite.

16. A method of manufacturing a fan casing according claim 7 comprising:
weaving a fiber texture to form said one piece annular body of three-dimensional woven composite material,
winding said fiber texture, over at least one turn, onto a mold having substantially the shape of said fan casing, so as to form a preform having the shape of said fan casing,
closing said mold by counter-shapes,
injecting a resin into said mold, and
polymerisation in said mold of said resin in order to obtain said fan casing made of a three-dimensional woven composite.

17. The fan casing according to claim 1, wherein the first annular portion, the second annular portion and the body forming a monolithic piece made of metallic material.

* * * * *